United States Patent
Jung et al.

(10) Patent No.: US 7,228,021 B2
(45) Date of Patent: Jun. 5, 2007

(54) BIDIRECTIONAL OPTICAL ADD/DROP MULTIPLEXER AND WAVELENGTH DIVISION MULTIPLEXED RING NETWORK USING THE SAME

(75) Inventors: Dae-Kwang Jung, Suwon-si (KR);
Yun-Je Oh, Yongin-si (KR);
Seong-Taek Hwang, Pyeongtaek-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/185,105

(22) Filed: Jul. 20, 2005

(65) Prior Publication Data
US 2006/0067612 A1    Mar. 30, 2006

(30) Foreign Application Priority Data
Sep. 24, 2004   (KR) .................. 10-2004-0077244

(51) Int. Cl.
G02B 6/12     (2006.01)
H04J 14/02    (2006.01)
(52) U.S. Cl. .......................... 385/14; 398/83
(58) Field of Classification Search .............. None
See application file for complete search history.

(56) References Cited

U.S. PATENT DOCUMENTS

2005/0025488 A1*  2/2005  Wang et al. ............... 398/83

* cited by examiner

*Primary Examiner*—Sung Pak
*Assistant Examiner*—Hoang Tran
(74) *Attorney, Agent, or Firm*—Cha & Reiter, L.L.C.

(57) ABSTRACT

Disclosed is a bidirectional optical add/drop multiplexer that includes a first filter for reflecting a first optical signal pre-selected among input forward optical signals and transmitting the remaining forward optical signals, a second filter for reflecting a second optical signal pre-selected among input reverse optical signals and transmitting the remaining reverse optical signals, a first optical splitter for combining the first optical signal and the forward optical signals by reflection from the first filter, wherein the reflected second optical signal having passed through the first filter is outputted to a connected second drop terminal and the first optical signal input from a connected first add terminal is outputted to the first filter, and a second optical splitter for adding the second optical signal and the reverse optical signals by reflection from the second filter, wherein the reflected first optical signal having passed through the second filter is outputted to a connected first drop terminal and the second optical signal input from a connected second add terminal is outputted to the second filter.

18 Claims, 9 Drawing Sheets

BIDIRECTIONAL OPTICAL ADD/DROP MULTIPLEXER AND WAVELENGTH DIVISION MULTIPLEXED RING NETWORK USING THE SAME

CLAIM OF PRIORITY

This application claims priority to an application entitled "Bidirectional Optical Add/Drop Multiplexer and Wavelength Division Multiplexed Ring Network Using the Same," filed in the Korean Intellectual Property Office on Sep. 24, 2004 and assigned Ser. No. 2004-77244, the contents of which are hereby incorporated by reference.

BACKGROUND OF THE INVENTION

1. Field of the Invention

The present invention relates to an optical add/drop multiplexer, and more particularly to a bidirectional optical add/drop multiplexer and a wavelength division multiplexed ring network using the same.

2. Description of the Related Art

Recently, demands for Internet-based diverse multimedia services has increased rapidly, and research on an economic passive optical network (PON) that can provide a large capacity of information has been pursued actively. A passive optical network includes a central office (CO) for providing a service, a plurality of subscriber devices for receiving the service, and remote nodes (RNs), installed in areas adjacent to the subscribers, for connecting the central office with the subscriber devices. An outdoor network typically includes passive optical devices; however, it does not include the central office or subscriber devices. Since a network in which a single central office accommodates hundred of thousands to millions of subscribers distributed in a small region cannot be established, a metro-access network is typically used. In such network, a plurality of subscriber networks are constructed around remote nodes that can accommodate a specified number of subscribers, and a central office accommodates the nodes to communicate with them.

Recently, research efforts have been made regarding a ring structure that adopts a wavelength division multiplexed transmission technology, that secures the reliability of network, and that has an easy extensibility. Such research intends to accommodate the demand for increasing communication bandwidth in the metro-access network. In the metro-access network, the central office and the remote nodes are connected in a ring structure and communicate with one another using the optical signals having inherent wavelengths in the wavelength division multiplexed metro-access network. Since respective remote nodes communicate with a central office using such inherent wavelength optical signals, an add/drop function capable of (1) dropping and receiving the optical signal of the corresponding wavelength transmitted from the central office and (2) adding and transmitting the optical signal of the corresponding wavelength to be transmitted to the central office has been required.

FIG. 1 is a view illustrating the construction of a typical bidirectional optical add/drop multiplexer. Referring to FIG. 1, the bidirectional optical add/drop multiplexer 100 is arranged in transmission lines 170 and 175. The bidirectional optical add/drop multiplexer 100 includes first to sixth circulators 110 to 120 and first and second fiber Bragg gratings (FBGs) 130 and 135. The second and third circulators 112 and 114 and the first fiber Bragg grating 130 are arranged in a first optical path 140 that connects the first circulator 110 with the fourth circulator 116. The fifth and sixth circulators 118 and 120 and the second fiber Bragg grating 135 are arranged in a second optical path 145 that connects the first circulator 110 with the fourth circulator 116.

The first circulator 110 has first to third ports. The first port is connected to the sixth circulator 120, the second port is connected to the transmission line 170, and the third port is connected to the second circulator 112. The first circulator 110 outputs a first optical signal $\lambda_1$ entering the second port to the third port and outputs a second optical signal $\lambda_2$ entering the first port to the second port.

The second circulator 112 has first to third ports. The first port is connected to the third port of the first circulator 110, the second port is connected to the first fiber Bragg grating 130, and the third port is connected to a first drop terminal 160. The second circulator 112 outputs the first optical signal entering the first port to the second port and outputs the first optical signal entering the second port to the third port.

The first fiber Bragg grating 130 is arranged between the second port of the second circulator 112 and the second port of the third circulator 114 The first fiber Bragg grating 130 reflects the first optical signal. In other words, the first fiber Bragg grating 130 reflects the first optical signal from the second circulator 112 to the second circulator 112 and reflects the first optical signal from the third circulator 114 to the third circulator 114. The first and second fiber Bragg gratings 130 and 135 reflect optical signals of pre-selected wavelengths and transmit optical signals with wavelengths other than the pre-selected wavelengths.

The third circulator 114 has first to third ports. The first port is connected to a first add terminal 150, the second port is connected to the first fiber Bragg grating 130, and the third port is connected to a first port of the fourth circulator 116. The third circulator 114 outputs the first optical signal entering the first port to the second port and outputs the first optical signal entering the second port to the third port.

The fourth circulator 116 has first to third ports. The first port is connected to the third port of the third circulator 114, the second port is connected to the transmission line 175, and the third port is connected to the first port of the fifth circulator 118. The fourth circulator 116 outputs the first optical signal entering the first port to the second port and outputs the second optical signal entering the second port to the third port.

The fifth circulator 118 has first to third ports. The first port is connected to a third port of the fourth circulator 116, the second port is connected to the second fiber Bragg grating 135, and the third port is connected to a second drop terminal 165. The fifth circulator 118 outputs the second optical signal entering the first port to the second port and outputs the second optical signal entering the second port to the third port.

The second fiber Bragg grating 135 is arranged between the second port of the fifth circulator 118 and the second port of the sixth circulator 120 and reflects the inputted second optical signal. In other words, the second fiber Bragg grating 135 reflects the second optical signal from the fifth circulator 118 to the fifth circulator 118 and reflects the second optical signal from the sixth circulator 120 to the sixth circulator 120.

The sixth circulator 120 has first to third ports. The first port is connected to a second add terminal 155, the second port is connected to the second fiber Bragg grating 135, and the third port is connected to the first port of the first circulator 110. The sixth circulator 120 outputs the second optical signal entering the first port to the second port and outputs the second optical signal entering the second port to the third port.

The process of dropping the first optical signal from the transmission line 170 by the bidirectional optical add/drop multiplexer 100 will now be explained.

The first optical signal entering the bidirectional optical add/drop multiplexer 100 through the transmission line 170 passes through the first and second circulators 110 and 112, in order, and the signal is inputted to the first fiber Bragg grating 130. The first optical signal is then reflected by the first fiber Bragg grating 130 and exits to the first drop terminal 160 through the second circulator 112.

The process of adding the first optical signal to the transmission line 175 by the bidirectional optical add/drop multiplexer 100 will now be explained.

The first optical signal entering the first add terminal 150 is inputted to the first fiber Bragg grating 130 through the third circulator 114. The first optical signal is then reflected by the first fiber Bragg grating 130 and exits to the transmission line 175 through the third and fourth circulators 114 and 116.

The process of dropping the second optical signal from the transmission line 175 by the bidirectional optical add/drop multiplexer 100 will now be explained.

The second optical signal entering the bidirectional optical add/drop multiplexer 100 through the transmission line 175 passes through the fourth and fifth circulators 116 and 118, in order, and the second optical signal is inputted to the second fiber Bragg grating 135. The second optical signal is then reflected by the second fiber Bragg grating 135 and exits to the second drop terminal 165 through the fifth circulator 118.

The process of adding the second optical signal to the transmission line 170 by the bidirectional optical add/drop multiplexer 100 will now be explained.

The second optical signal entering the second add terminal 155 is inputted to the second fiber Bragg grating 135 through the sixth circulator 120. The second optical signal is then reflected by the second fiber Bragg grating 135 and exits to the transmission line 170 through the sixth and first circulators 120 and 110.

The bidirectional optical add/drop multiplexer 100, as described above, has the problems that it employs six expensive circulators 110 to 120, and the implementation cost, therefore, is high. In addition, the number of optical elements through which optical signals to be added or dropped pass is large, causing a great optical loss. Furthermore, crosstalk caused by optical signals having the same wavelength may occur due to the incomplete reflection by the fiber Bragg gratings 130 and 135. Specifically, if the optical signals to be dropped are not completely reflected by the fiber Bragg gratings 130 and 135, the transmitted optical signals cause crosstalk to the optical signals of the same wavelengths to be added after being reflected by the fiber Bragg gratings 130 and 135. Conversely, if the optical signals to be added are not completely reflected by the fiber Bragg gratings 130 and 135, the transmitted optical signals cause crosstalk to the optical signals of the same wavelengths to be dropped after being reflected by the fiber Bragg gratings 130 and 135. In such situation, crosstalk between optical signals of same wavelength can be avoided only by heightening the reflection rate of the fiber Bragg gratings 130 and 135 greatly.

SUMMARY OF THE INVENTION

Accordingly, the present invention has been designed to solve the above and other problems occurring in the prior art. One aspect of the present invention is to provide a bidirectional optical add/drop multiplexer and a wavelength division multiplexed ring network using the same that can reduce the number of elements to reduce optical loss and that can be implemented at low cost.

In one embodiment, a bidirectional optical add/drop multiplexer comprises: a first filter for reflecting first optical signal of pre-selected wavelength, among entering forward optical signals, and transmitting remaining forward optical signals; a second filter for reflecting second optical signal of pre-selected wavelength, among entering reverse optical signals, and transmitting remaining reverse optical signals; a first optical splitter for combining the first optical signal and the forward optical signals by reflection from the first filter, wherein the reflected second optical signal transmitted through the first filter is outputted to a connected second drop terminal and the first optical signal inputted from a connected first add terminal is outputted to the first filter; and a second optical splitter for combining the second optical signal and the reverse optical signals by reflection from the second filter, wherein the reflected first optical signal transmitted through the second filter is outputted to a connected first drop terminal and the second optical signal from a connected second add terminal is outputted to the second filter.

BRIEF DESCRIPTION OF THE DRAWINGS

The above features and advantages of the present invention will be more apparent from the following detailed description taken in conjunction with the accompanying drawings, in which.

DETAILED DESCRIPTION

The present invention will be described in detail hereinafter with reference to the accompanying drawings. For the purposes of clarity and simplicity, only parts necessary for understanding the operation of the present invention will be explained but a detailed description of known functions and configurations incorporated herein will be omitted when it obscures the subject matter of the present invention.

Figure 1:
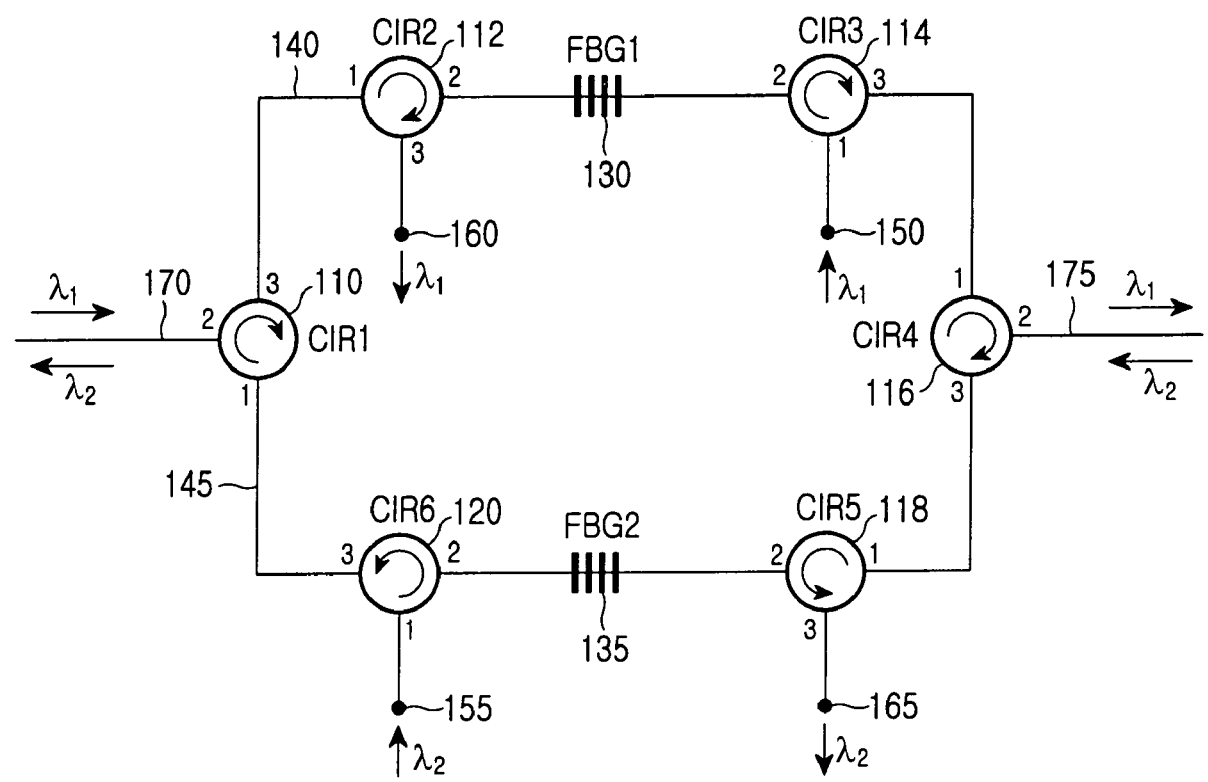
FIG. 1 is a view illustrating the construction of a typical bidirectional optical add/drop multiplexer.
Figure 2:
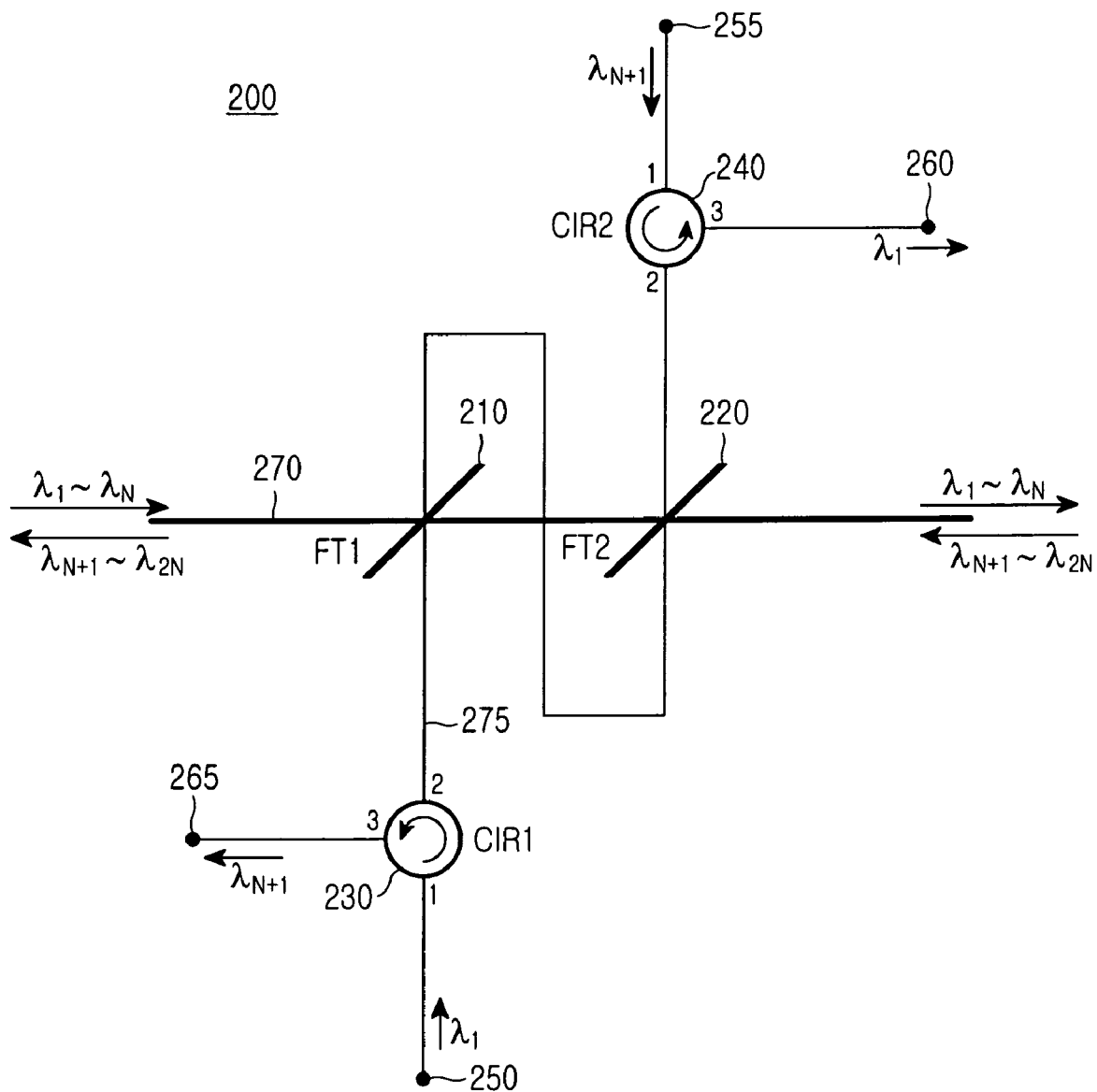
FIG. 2 is a view illustrating the construction of a bidirectional optical add/drop multiplexer according to one embodiment of the invention.

FIG. 2 is a view illustrating the construction of a bidirectional optical add/drop multiplexer according to an embodiment of the invention. Referring to FIG. 2, the bidirectional optical add/drop multiplexer 200 is arranged in transmission lines and it includes first and second filter 210 and 220 and first and second circulators 230 and 240. The circulators 230 and 240 act as optical splitters. The first and second filters 210 and 220 are arranged in the first optical path 270. The first circulator 230, the first and second filters 210 and 220, and the second circulator 240 are arranged in the second optical path 275. Both terminals of the first optical path 270 are connected to the transmission lines. The first and second optical paths 270 and 275 may be optical fibers or optical waveguides. The first and second optical paths 270 and 275 cross each other twice, and the corresponding filters 210 and 220 are arranged at respective cross points. In FIG. 2, the first and second optical paths 270 and 275 appear to cross each other three times; however, the two cross each other only twice. The first and second optical paths 270 and 275 may also cross each other three times.

The first filter 210 is arranged at the first cross point of the first and second optical paths 270 and 275. The filter 210 reflects and outputs the first optical signal $\lambda_1$ to the second optical path 275 and transmits remaining optical signals $\lambda_2$ to $\lambda_{2N}$. The first and second filters 210 and 220 reflect an optical signal of a pre-selected wavelength and transmit optical signals of other wavelengths. The first filter 210, along with the second filter 220, includes a double-sided thin film filter composed of a transparent substrate and multilayer thin films coated on both surfaces of the substrate. At the first crossing point, the first and second optical paths 270 and 275 may cross at right angles, and the first filter 210 may be arranged at an angle of 45 degrees to the respective optical paths. The first to N-th optical signals may be forward optical signals in a certain communication network or those signals that propagate clockwise. The (N+1)-th to (2N)-th optical signals may be reverse optical signals on the communication network or those signals that propagate counterclockwise.

The second filter 220 is arranged at the second cross point of the first and second optical paths 270 and 275. The second filter 220 reflects and outputs an inputted (N+1)-th optical signal $\lambda_{N+1}$ to the second optical path 275 and transmits the remaining optical signals $\lambda_1$ to $\lambda_N$ and $\lambda_{N+2}$ to $\lambda_{2N}$. At the second crossing point, the first and second optical paths 270 and 275 may cross at right angles, and the second filter 220 may be arranged to be at an angle of 45 degrees to the respective optical paths.

The first circulator 230 is arranged at one terminal of the second optical path 275, and it 230 has first to third ports. The first port is connected to the first add terminal 250, the second port is connected to the first filter 210, and the third port is connected to the second drop terminal 265. The first circulator 230 outputs the first optical signal entering the first port to the second port and outputs the (N+1)-th optical signal entering the second port to the third port.

The second circulator 240 is arranged at the other terminal of the second optical path 275, and it has first to third ports. The first port is connected to a second add terminal 255, the second port is connected to the second filter 220, and the third port is connected to a first drop terminal 260. The second circulator 240 outputs the (N+1)-th optical signal entering the first port to the second port and outputs the first optical signal entering the second port to the third port.

Figure 3:
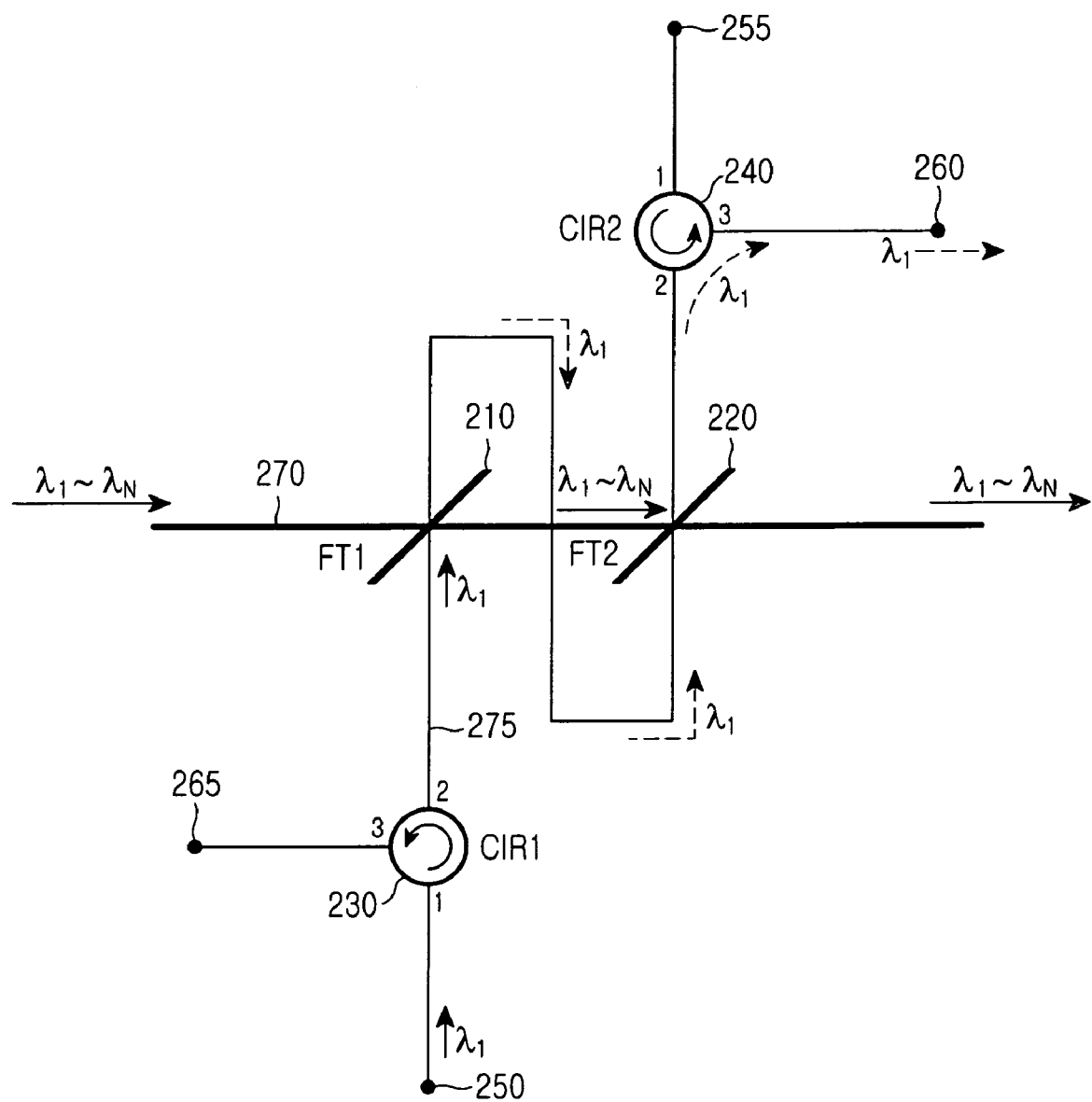
FIG. 3 is a view explaining a process of adding/dropping the first optical signal by the bidirectional optical add/drop multiplexer illustrated in FIG. 2.

FIG. 3 is a view explaining a process of adding/dropping the first optical signal by the bidirectional optical add/drop multiplexer 200.

The process of dropping the first optical signal from the transmission line by the bidirectional optical add/drop multiplexer 200 will now be explained.

The second to N-th optical signals, among the first to N-th optical signals, enter the bidirectional optical add/drop multiplexer 200 through the transmission line and exit to the transmission line through the first and second filters 210 and 220. The first optical signal is reflected by the first filter 210 and exits to the first drop terminal 260 through the second filter 220 and the second circulator 240.

The process of adding the first optical signal to the transmission line by the bidirectional optical add/drop multiplexer 200 will now be explained.

The first optical signal inputted through the first add terminal 250 is transmitted to the first filter 210 through the first circulator 230. The first optical signal reflected by the first filter 210 exits to the transmission line through the second filter 220.

Figure 4:
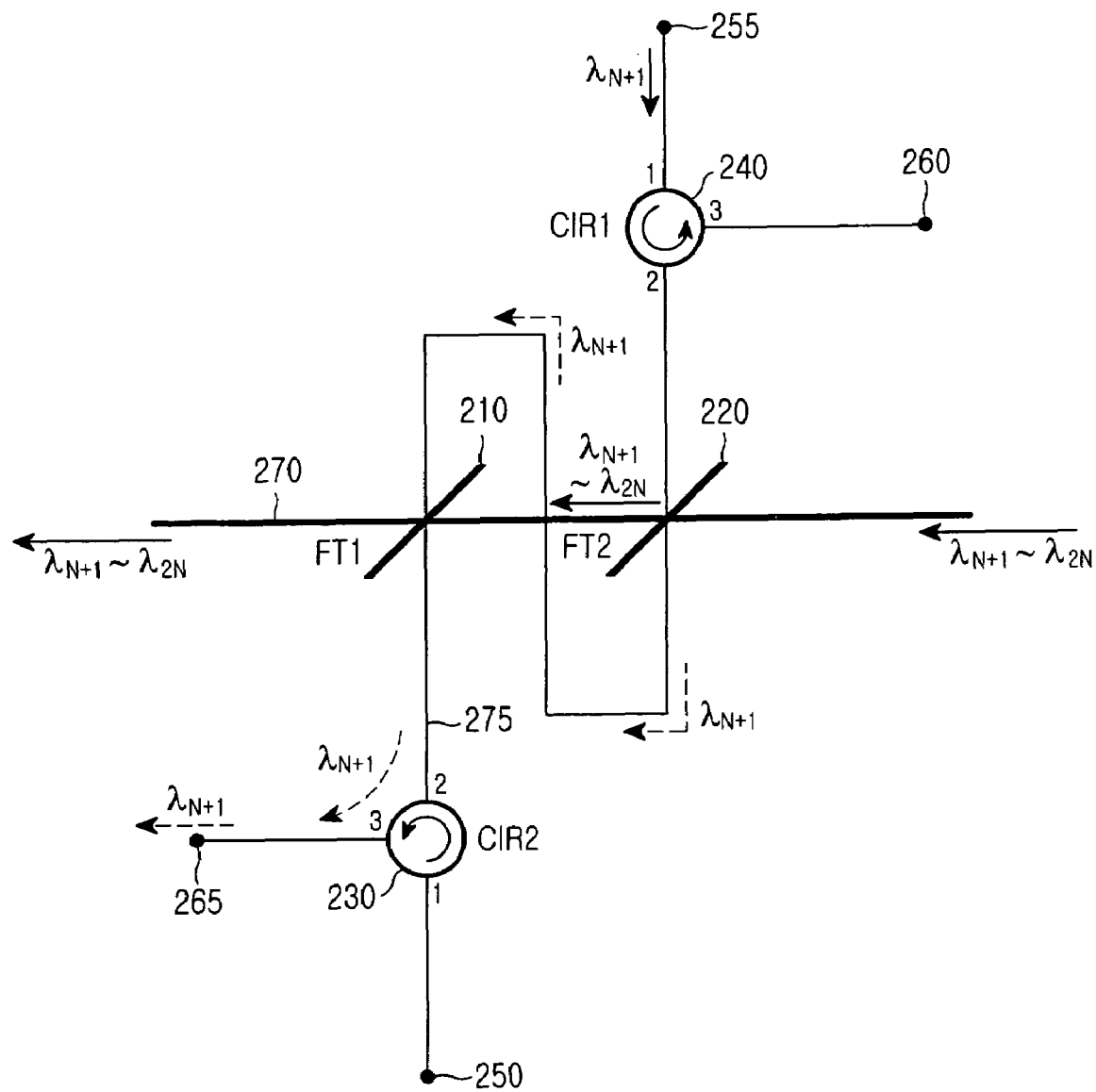
FIG. 4 is a view explaining a process of adding/dropping the (N+1)-th optical signal by the bidirectional optical add/drop multiplexer illustrated in FIG. 2.

FIG. 4 is a view explaining a process of adding/dropping the (N+1)-th optical signal by the bidirectional optical add/drop multiplexer 200.

The process of dropping the (N+1)-th optical signal from the transmission line by the bidirectional optical add/drop multiplexer 200 will now be explained.

The (N+2)-th to (2N)-th optical signals, among the (N+1)-th to (2N)-th optical signals, enter the bidirectional optical add/drop multiplexer 200 through the transmission line and exit to the transmission line through the second and first filters 220 and 210. The (N+1)-th optical signal is reflected by the second filter 220, and the signal exit to the second drop terminal 265 through the first filter 210 and the first circulator 230.

The process of adding the (N+1)-th optical signal to the transmission line by the bidirectional optical add/drop multiplexer 200 will now be explained.

The (N+1)-th optical signal entering through the second add terminal 255 is transmitted to the second filter 220 through the second circulator 240. The (N+1)-th optical signal is reflected by the second filter 220, and the signal exits to the transmission line through the first filter 210.

Figure 5:
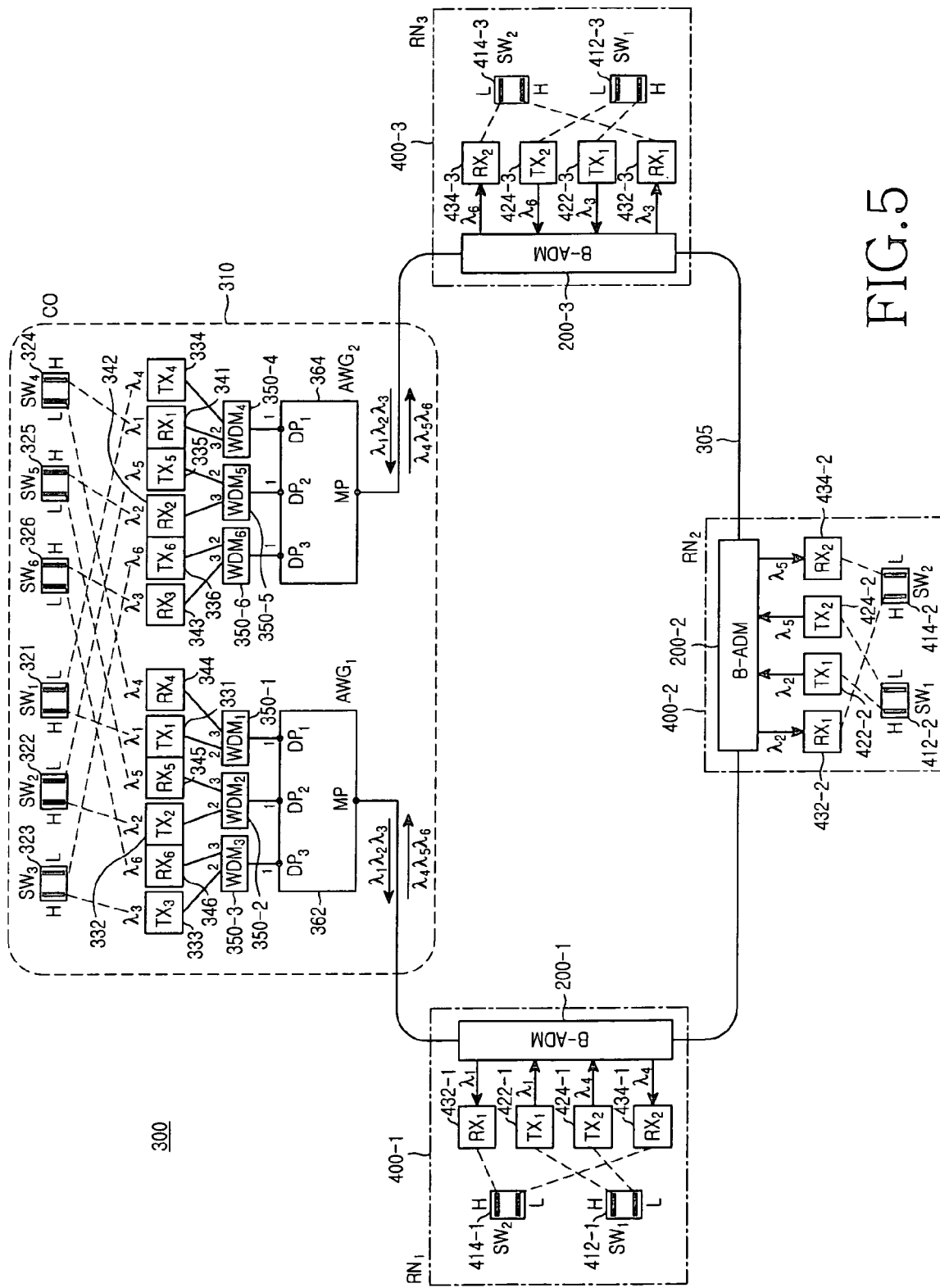
FIG. 5 is a view illustrating the construction of a bidirectional wavelength division multiplexed ring network using the bidirectional optical add/drop multiplexer according to the invention.

FIG. 5 is a view illustrating the construction of a bidirectional wavelength division multiplexed ring network using the bidirectional optical add/drop multiplexer according to the present invention. The ring network 300 includes a central office 310 and first to third remote nodes 400-1 to 400-3 in a ring structure using a transmission line 305. The first to third remote nodes 400-1 to 400-3 include bidirectional optical add/drop multiplexers 200-1 to 200-3 having the construction as illustrated in FIG. 2. Normally, the respective remote nodes 400-1 to 400-3 add/drop the optical signals bidirectionally through the single transmission line 305. Accordingly, they communicate with the central office 310 through two optical signals, and sufficient communication bandwidth can be secured.

The ring network 300 transmits first to third optical signals $\lambda_1$ to $\lambda_3$ of a high priority in counterclockwise direction and transmits fourth to sixth optical signals $\lambda_4$ to $\lambda_6$ of a low priority in clockwise direction. Here, the high-priority optical signal refers to an optical signal that carries high-priority data. In the embodiment of the present invention, the high-priority or low-priority optical signals may be changed according to presence of an impediment to transmission. For example, if an impediment is not present, the third optical signal is of high priority and the sixth optical signal is of low priority. However, if an impediment is present, the sixth optical signal is of high priority and the third optical signal is of low priority.

The central office 310 includes first to sixth switches (SW) 321 to 326, first to sixth optical transmitters (TX) 331 to 336, first to sixth optical receivers (RX) 341 to 346, first to sixth wavelength division multiplexers (WDM) 350-1 to 350-6, and first and second arrayed waveguide gratings (AWG) 362 and 364.

The first to third switches 321 to 323, transmitting-end switches, transmits data and the fourth to sixth switches 324 to 326, receiving-end switches, receives data. The first to sixth switches 321 to 326 are kept in bar state during absence of any impediment. However, if an impediment is present, at least one of the switches is converted to cross state. In bar state, the m-th switches 321 to 323 connect high-priority terminals H, to which high-priority data is inputted, with the m optical transmitters 331 to 333 and connect low-priority terminals L, to which low-priority data is inputted, with the (m+3)-th optical transmitters 334 to 336. Here, m denotes a natural number that is not more than 3. In cross state, the m-th switches 321 to 323 connect the high-priority terminals with the (m+3)-th optical transmitters 334 to 336. In addition, m-th switches connect the low-priority terminals with the m-th optical transmitters 331 to 333. In bar state, the (m+3)-th switches 324 to 326 connect high-priority terminals, which output high-priority data, with the m-th optical receivers 341 to 343 and connect low-priority terminals, which output low-priority data, with the (m+3)-th optical receivers 344 to 346. In the cross state, the (m+3)-th switches 324 to 326 connect the high-priority terminals with the (m+3)-th optical receivers 334 to 336 and connect the low-priority terminals with the m-th optical receivers 341 to 343.

The first to sixth optical transmitters 331 to 336 output corresponding optical signals generated by respective input data and the m-th to (m+3)-th optical transmitters 331, 334; 332, 335; and 333, 336 are connected with the m-th switches 321 to 323. The n-th optical transmitters 331 to 336 output the n-th optical signals. Here, n denotes a natural number that is not more than 6.

The first to sixth optical receivers 341 to 346 convert the corresponding input optical signals into data and output such data. The m-th to (m+3)-th optical receivers 341, 344; 342, 345; and 343, 346 are connected with the (m+3)-th switches 324 to 326. The n-th optical receivers 341 to 346 receive the n-th optical signals.

The first to sixth wavelength division multiplexers 350-1 to 350-6 have first to third ports. The first to third wavelength division multiplexers 350-1 to 350-3 are connected to the first arrayed waveguide grating 362 and the fourth to sixth wavelength division multiplexers 350-4 to 350-6 are connected to the second arrayed waveguide grating 364. The first ports of the m-th wavelength division multiplexers 350-1 to 350-3 are connected to the m-th de-multiplexing ports of the first arrayed waveguide grating 362, the second ports thereof are connected to the m-th optical transmitters 331 to 333, and the third ports thereof are connected to the (m+3)-th optical receivers 344 to 346. The m-th wavelength division multiplexers 350-1 to 350-3 output the (m+3)-th optical signals entering the first ports to the third ports, and subsequently, to the (m+3)-th optical receivers 344 to 346. In addition, the $m^{th}$ wavelength division multiplexers 350-1 to 350-3 output the m-th optical signals from the m-th optical transmitters 331 to 333 through the second ports and to the first ports.

The first ports of the (m+3)-th wavelength division multiplexers 350-4 to 350-6 are connected to the m-th de-multiplexing ports of the second arrayed waveguide grating 364, the second ports thereof are connected to the (m+3)-th optical transmitters 334 to 336, and the third ports thereof are connected to the m-th optical receivers 341 to 343. The (m+3)-th wavelength division multiplexers 350-4 to 350-6 output the m-th optical signals entering the first ports through the third ports, and subsequently, to the m-th optical receivers 341 to 343. In addition, the (m+3)-th wavelength division multiplexers 350-4 to 350-6 output the (m+3)-th optical signals from the (m+3)-th optical transmitters 334 to 336 through the second ports to the first ports.

The first arrayed waveguide grating 362 has a multiplexing port MP and first to third de-multiplexing ports. The multiplexing port is connected to the transmission line 305, and the first to third de-multiplexing ports are connected to the first to third wavelength division multiplexers 350-1 to 350-3. The first arrayed waveguide grating 362 de-multiplexes and outputs the fourth to sixth optical signals entering the multiplexing port to the first to third de-multiplexing ports. In addition, first arrayed waveguide grating 362 multiplexes and outputs the first to third optical signals entering the first to third de-multiplexing ports to the multiplexing port.

The second arrayed waveguide grating 364 has a multiplexing port MP and first to third de-multiplexing ports. The multiplexing port is connected to the transmission line 305, and the first to third de-multiplexing ports are connected to the fourth to sixth wavelength division multiplexers 350-4 to 350-6. The second arrayed waveguide grating 364 de-multiplexes and outputs the first to third optical signals entering the multiplexing port to the first to third de-multiplexing ports. In addition, the second arrayed waveguide grating 364 multiplexes and outputs the fourth to sixth optical signals entering the first to third de-multiplexing ports to the multiplexing port.

Figure 6:
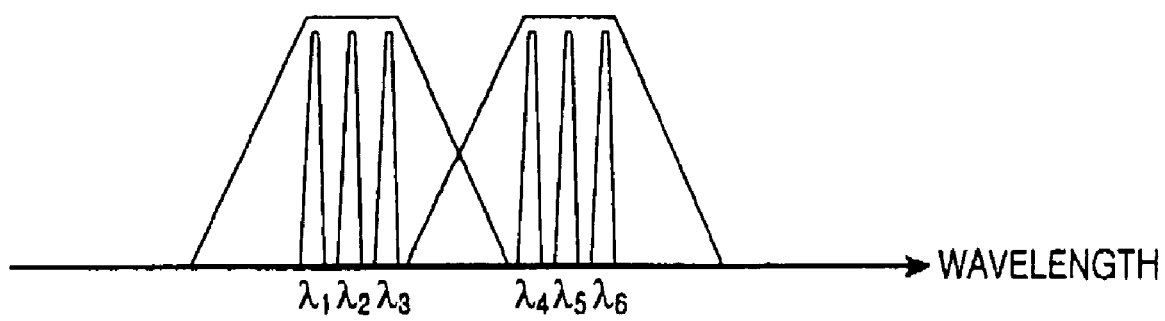
FIG. 6 is a view illustrating spectrums of optical signals being transmitted in the ring network illustrated in FIG. 5.

FIG. 6 is a view illustrating spectrums of the optical signals being transmitted in the ring network. As illustrated in FIG. 6, the wavelength bands of the first to third optical signals, transmitted counterclockwise, and the wavelength bands of the fourth to sixth optical signals, transmitted clockwise, are allocated differently. Also, the respective wavelength bands are set to correspond to a free spectral range of the respective arrayed waveguide gratings 362 and 364. The band pass characteristic of the arrayed waveguide gratings 362 and 364 is periodic according to the free spectral range. Such periodicity enables the arrayed waveguide gratings 362 and 364 to process two wavelength bands.

Figure 7:
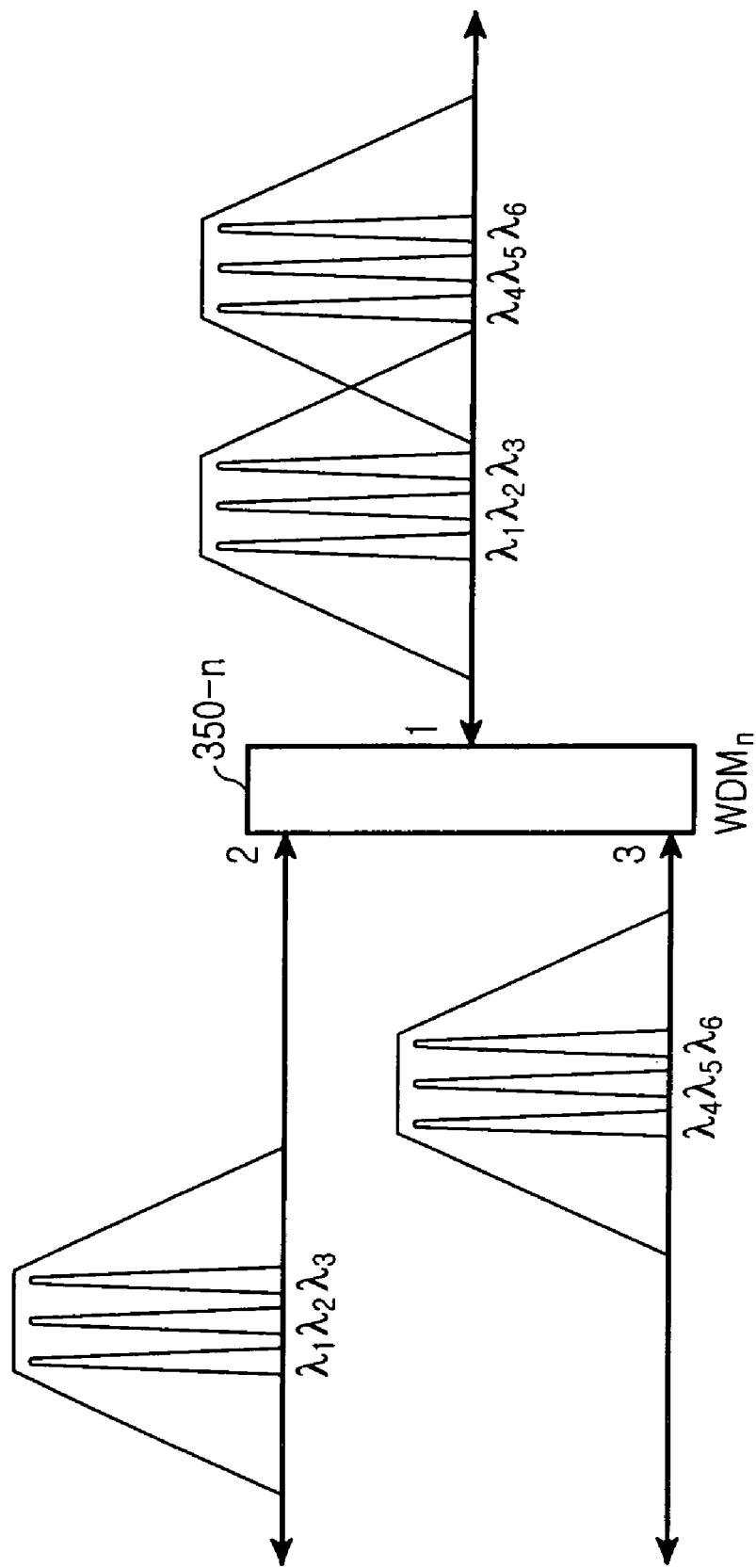
FIG. 7 is a view illustrating spectrums of optical signals passing through the n-th wavelength division multiplexer 350-*n* illustrated in FIG. 5.

FIG. 7 is a view illustrating spectrums of the optical signals passing through the n-th wavelength division multiplexer 350-$n$. As illustrated in FIG. 7, the n-th wavelength division multiplexer 350-$n$ separates two wavelength bands entering the first port and outputs the separated wavelength bands through the second and third ports. Conversely, the n-th wavelength division multiplexer 350-$n$ combines the two wavelength bands entering the second and third ports and outputs the combined wavelength band through the first port.

Returning to FIG. 5, the first to third remote nodes 400-1 to 400-3 have similar construction; however, the nodes process different signals. That is, the first remote node 400-1 adds/drops the first and fourth optical signals, the second remote node 400-2 adds/drops the second and fifth optical signals, and the third remote nodes 400-3 adds/drops the third and sixth optical signals.

The first to third remote nodes 400-1 to 400-3 include bidirectional optical add/drop multiplexers 200-1 to 200-3; first and second optical transmitters 422-1, 424-1; 422-2, 424-2; and 422-3, 424-3; first and second optical receivers

432-1, 434-1; 442-2, 434-2; and 432-3, 434-3; and first and second switches 412-1, 414-1; 412-2, 414-2; and 412-3, 414-3, respectively.

Hereinafter, the m-th remote node 400-*m* will be explained.

The first switch 412-*m*, a transmitting-end switch, transmits data and the second switch 414-*m*, a receiving-end switch, receives the data. The first and second switches 412-*m* and 414-*m* are kept in bar state if no impediment to transmission is present; however, if impediment is present, at least one of the switches is converted to cross state. In bar state, the first switch 412-*m* connects high-priority terminals, where high-priority data is inputted, with the first optical transmitter 422-*m* while connecting low-priority terminals, where low-priority data is inputted, with the second optical transmitter 424-*m*. In cross state, the first switch 412-*m* connects the high-priority terminals with the second optical transmitter 424-*m* while connecting the low-priority terminals with the first optical transmitter 422-*m*. In bar state, the second switch 414-*m* connects high-priority terminals, which output high-priority data, with the first optical receiver 432-*m* while connecting low-priority terminals, which output low-priority data, with the second optical receiver 434-*m*.

In cross state, the second switch 414-*m* connects the high-priority terminals with the second optical receiver 434-*m* while connecting the low-priority terminals with the first optical receiver 432-*m*.

The first and second optical transmitters 422-*m* and 424-*m* output optical signals generated by respective input data, and the first and second optical transmitters 422-*m* and 424-*m* are connected to the first switch 412-*m*. The first optical transmitter 422-*m* outputs the m-th optical signals, and the second optical transmitter 424-*m* outputs the (m+3)-th optical signals.

The first and second optical receivers 432-*m* and 434-*m* convert the input optical signals to data and output the data. The first and second optical receivers 432-*m* and 434-*m* are connected to the second switch 414-*m*. The first optical receiver 432-*m* receives the m-th optical signals, and the second optical receiver 434-*m* receives the (m+3)-th optical signals.

Figure 8:
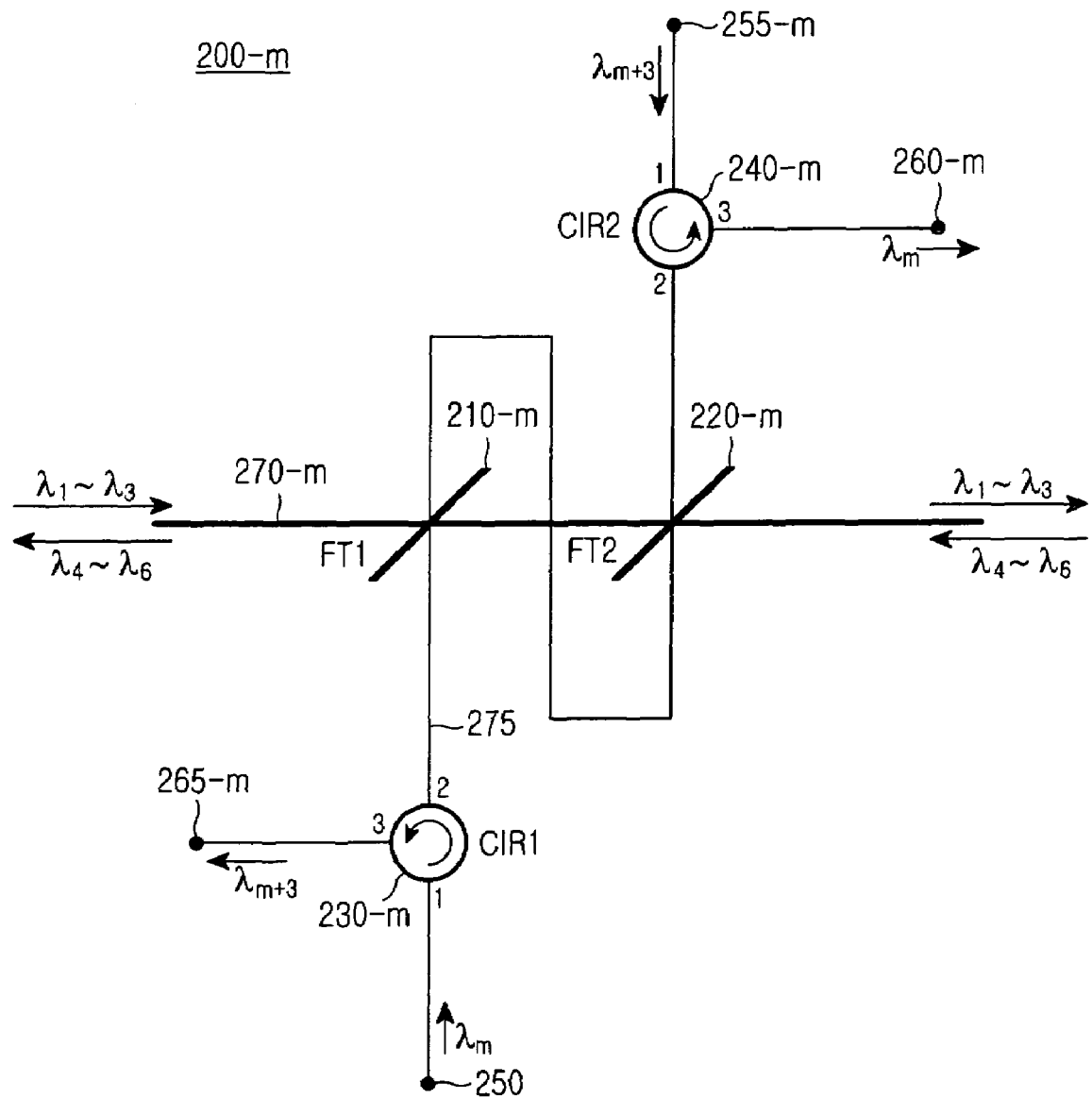
FIG. 8 is a view illustrating the construction of the bidirectional optical add/drop multiplexer 200-*m* of the m-th remote node 400-*m* illustrated in FIG. 5.

FIG. 8 is a view illustrating the construction of a bidirectional optical add/drop multiplexer 200-*m* of the m-th remote node 400-*m*. Since the construction of the bidirectional optical add/drop multiplexer 200-*m* is similar to that in FIG. 2, only the process of adding/dropping optical signals will be explained. First, the process of dropping the m-th optical signal from the transmission line by the m-th bidirectional optical add/drop multiplexer 200-*m* will be explained.

The optical signals among the first to third optical signals entering the m-th bidirectional optical add/drop multiplexer 200-*m* through the transmission line exit to the transmission line through first and second filters 210-*m* and 220-*m*. Such optical signals, however, exclude the m-th optical signal. The m-th optical signal, instead, is reflected by a first filter 210-*m* and exit to a first drop terminal 260-*m* through a second filter 220-*m* and a second circulator 240-*m*.

The process of adding the m-th optical signal to the transmission line by the bidirectional optical add/drop multiplexer 200-*m* will now be explained.

The m-th optical signal entering through a first add terminal 250-*m* is transmitted to the first filter 210-*m* via a first circulator 230-*m*. The m-th optical signal is then reflected by the first filter 210-*m* and exits to the transmission line through the second filter 220-*m*.

The process of dropping the (m+3)-th optical signal from the transmission line by the bidirectional optical add/drop multiplexer 200-*m* will now be explained.

The optical signals among the fourth to sixth optical signals enter the bidirectional optical add/drop multiplexer 200-*m* through the transmission line and exit to the transmission line through the second and first filters 220-*m* and 210-*m*. Such optical signals, however, exclude (M+3)-th optical signal. The (m+3)-th optical signal, instead, is reflected by the second filter 220-*m* and exit the second drop terminal 265-*m* through the first filter 210-*m* and the first circulator 230-*m*.

The process of adding the (m+3)-th optical signal to the transmission line by the bidirectional optical add/drop multiplexer 200-*m* will now be explained.

The (m+3)-th optical signal entering through the second add terminal 255-*m* is transmitted to the second filter 220-*m* via the second circulator 240-*m*. The (m+3)-th optical signal is then reflected by the second filter 220-*m* and exits to the transmission line through the first filter 210-*m*.

Figure 9:
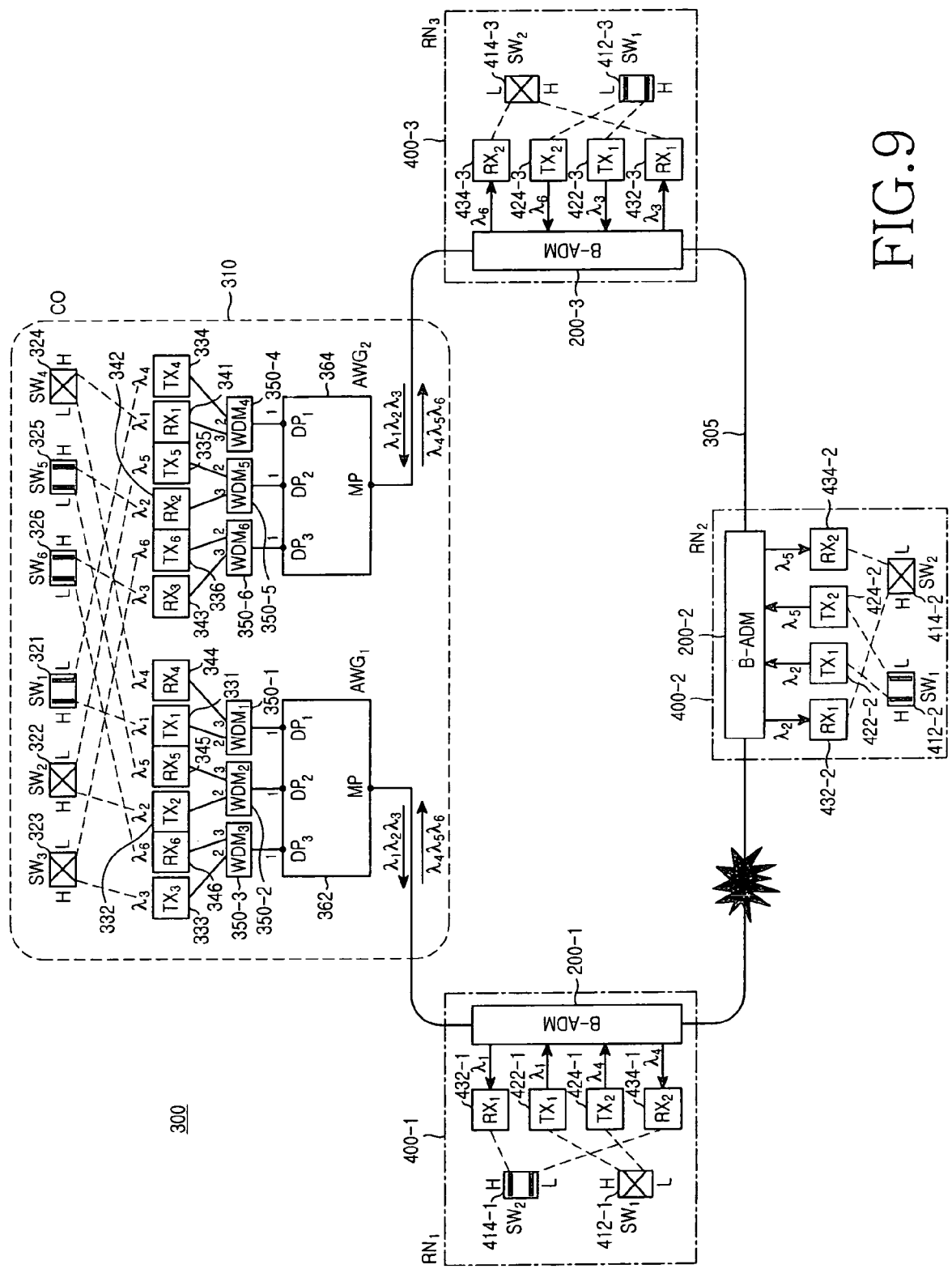
FIG. 9 is a view illustrating the ring network of FIG. 5 in which an impediment to transmission is present.

FIG. 9 is a view illustrating the ring network of FIG. 5 with impediment to the transmission. FIG. 9 shows the case that the transmission line between the first remote node and the second remote node is cut off. If the impediment is present in the ring network 300, half of the optical signals propagating in the transmission line in forward direction is lost. In such situation, the central office 310 and the respective remote nodes 400-1 to 400-3 can detect presence of impediment in and determine the position of the impediment by checking whether the optical signals entering the respective optical receivers are also exiting.

With presence of impediment, the second and third remote nodes 400-2 and 400-3 cannot receive the second and third optical signals, transmitted counterclockwise, from the central office 310. In addition, the first remote node 400-1 cannot receive the fourth optical signal, transmitted clockwise, from the central office 310. Furthermore, the presence of the hindrance will prohibit the central office 310 from receiving the first optical signal, transmitted counterclockwise, from the first remote node 400-1 and from receiving the fifth and sixth optical signals, transmitted clockwise, from the second and third remote nodes 400-2 and 400-3. In absence of any impediment, the fourth optical signal carried the low-priority data; the second and third optical signals carried the high-priority data; the fifth and sixth optical signals carried the low-priority data; and the first optical signal carried the high-priority data.

Upon detecting impediment in the transmission line, the central office 310 converts the second and third switches 322 and 323 to cross state to restore the high-priority data. Accordingly, the high-priority data is carried in the fifth and sixth optical signals 325 and 326. Moreover, converting the second switch 414-2 enables the second remote node 400-2 to receive the fifth optical signal and the third remote node 400-3 to receive the sixth optical signal.

Conversion to cross state also occurs with respect to the first switch 412-1. Upon detecting the impediment, the first remote node 400-1 converts the first switch 412-1 to the cross state to restore the high-priority data. Accordingly, the high-priority data are carried in the fourth optical signal and the central office 310 receives the fourth optical signal by converting the fourth switch to cross state.

As described above, it will be apparent that the bidirectional optical add/drop multiplexer according to the present invention can be implemented at low cost and can reduce optical loss by reducing the number of elements. The wavelength division multiplexed ring network using the bidirectional optical add/drop multiplexer can also be implemented at low cost and can reduce optical loss.

Moreover, the wavelength division multiplexed ring network using the bidirectional optical add/drop multiplexer according to the present invention can expand the number of accommodated remote nodes and transmission distance by reducing the number of optical elements through which signals to be added/dropped pass, thereby reducing optical loss.

Furthermore, the wavelength division multiplexed ring network using the bidirectional optical add/drop multiplexer according to the present invention can reduce the cost for implementation by improving the transmission efficiency through the use of a bidirectional transmission line and can secure the reliability of network by promptly restoring the transmission line when an impediment to transmission is present.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A bidirectional optical add/drop multiplexer comprising:
   a first optical line having first and second cross points;
   a second optical line configured to pass the first optical line at the first and second cross points;
   a first filter disposed at the first cross point and configured to reflect a first optical signal having a pre-selected among input forward optical signals, pass the remaining forward optical signals, and add an optical signal input from a first add terminal to the remaining forward optical signals;
   a second filter disposed at the second cross point and configured to reflect a second optical signal having a pre-selected among input reverse optical signals, pass the remaining reverse optical signals, and add an optical signal input from a second add terminal to the remaining reverse optical signals;
   a first optical splitter disposed in the second optical line and configured to output the optical signal from the first add terminal to the first filter, wherein the reflected second optical signal having passed through the first filter is outputted to a second drop terminal; and
   a second optical splitter disposed in the second optical line and configured to output the optical signal from the second add terminal to the second filter, wherein the reflected first optical signal having passed through the second filter is outputted to a first drop terminal.

2. The bidirectional optical add/drop multiplexer as claimed in claim 1, wherein each of the first and the second filters comprises double-sided thin film filter with a transparent substrate and multilayer thin films coated on both surfaces of the substrate.

3. The bidirectional optical add/drop multiplexer as claimed in claim 1, wherein the first optical splitter comprises an optical circulator with first to third ports, wherein the first port is connected to the first add terminal, the second port is connected to the first filter, and the third port is connected to the second drop terminal.

4. The bidirectional optical add/drop multiplexer as claimed in claim 1, wherein the second optical splitter comprises an optical circulator with first to third ports, wherein the first port is connected to the second add terminal, the second port is connected to the second filter, and the third port is connected to the first drop terminal.

5. The bidirectional optical add/drop multiplexer as claimed in claim 1, wherein the first and second optical lines comprises optical fibers.

6. The bidirectional optical add/drop multiplexer as claimed in claim 1, wherein the first and second optical lines comprise optical waveguides.

7. The bidirectional optical add/drop multiplexer as claimed in claim 1, wherein the first filter is arranged at a predetermined angle with respect to the first optical line and the second filter is arranged at a predetermined angle with respect to the second optical line.

8. The bidirectional optical add/drop multiplexer as claimed in claim 7, wherein the predetermined angles are 45 degrees.

9. A bidirectional optical add/drop multiplexer comprising:
   a first optical line having first and second cross points;
   a second optical line configured to pass the first optical line at the first and second cross points;
   a first filter arranged at the first cross point and configured to reflect a first optical signal having a pre-selected wavelength, among forward optical signals input through the first optical line, to the second optical line, transmit the remaining forward optical signals, and add an optical signal input from a first add terminal with the remaining forward optical signals;
   a second filter arranged at the second cross point and configured to reflect a second optical signal having a pre-selected wavelength, among reverse optical signals input through the first optical line, to the second optical line, transmit the remaining reverse optical signals, and add an optical signal input from a second add terminal with the remaining reverse optical signals;
   a first optical splitter arranged on one side of the second optical line and configured to output the optical signal input from the first add terminal to the first filter, wherein the reflected second optical signal having passed through the first filter is output to a second drop terminal; and
   a second optical splitter, arranged on the other side of the second optical line and configured to output the optical signal input from the second add terminal to the second filter, wherein the reflected first optical signal having passed through the second filter is output to a first drop terminal.

10. The bidirectional optical add/drop multiplexer as claimed in claim 9, wherein each of the first and second filters comprises double-sided thin film filter with a transparent substrate and multilayer thin films coated on both surfaces of the substrate.

11. The bidirectional optical add/drop multiplexer as claimed in claim 9, wherein the first optical splitter comprises an optical circulator with first to third ports, wherein the first port is connected to the first add terminal, the second port is connected to the first filter, and the third port is connected to the second drop terminal.

12. The bidirectional optical add/drop multiplexer as claimed in claim 9, wherein the second optical splitter comprises an optical circulator with first to third ports, wherein the first port is connected to the second add terminal, the second port is connected to the second filter, and the third port is connected to the first drop terminal.

13. The bidirectional optical add/drop multiplexer as claimed in claim 9, wherein the optical lines are comprised of optical fibers.

14. The bidirectional optical add/drop multiplexer as claimed in claim 9, wherein the optical lines comprise optical waveguides.

15. The bidirectional optical add/drop multiplexer as claimed in claim 9, wherein the first filter is arranged at 45 degrees angle with respect to the first optical line and the second filter is arranged at 45 degrees angle with respect to the second optical line.

16. A bidirectional wavelength division multiplexed ring network having a central office and a plurality of remote nodes connected to the central office through a transmission line to form a ring structure;

wherein the respective remote node comprises a bidirectional optical add/drop multiplexer configured to drop first and second optical signals of pre-selected wavelengths, among forward and reverse optical signals input through the transmission line, and adding optical signals input from first and second add terminals, respectively, to the transmission line, wherein the bidirectional optical add/drop multiplexer comprises:

a first optical line having first and second cross points;

a second optical line configured to pass the first optical line at the first and second cross points;

a first filter disposed at the first cross point and configured to reflect a first optical signal of pre-selected wavelength among input forward optical signals, transmit the remaining forward optical signals, and add an optical signal input from a first add terminal with the remaining forward optical signals;

a second filter disposed at the second cross point and configured to reflect a second optical signal of pre-selected wavelength among input reverse optical signals, transmit the remaining reverse optical signals, and add an optical signal input from a second add terminal with the remaining forward optical signals;

a first optical splitter disposed on the second optical line and configured to output the optical signal input from the first add terminal to the first filter, wherein the reflected second optical signal being transmitted through the first filter is outputted to a second drop terminal;

a second optical splitter disposed on the second optical line and configured to output the optical signal from the second add terminal to the second filter, wherein the reflected first optical signal being transmitted through the second filter is outputted to a first drop terminal.

17. The bidirectional optical add/drop multiplexer as claimed in claim 16, wherein the first filter is arranged at a predetermined angle with respect to the first optical line and the second filter is arranged at a predetermined angle with respect to the second optical line.

18. The bidirectional optical add/drop multiplexer as claimed in claim 17, wherein the predetermined angles are 45 degrees.

* * * * *